(12) United States Patent
Sham et al.

(10) Patent No.: US 6,439,106 B1
(45) Date of Patent: Aug. 27, 2002

(54) AUTOMATIC COFFEE MAKER WITH GRINDER

(76) Inventors: John C. K. Sham, Rm. 1508, Block C, 19 Broadwood Rd., Hong Kong (HK); Kumkit Kunavongvorakul, 889 Thai C. C. Tower 18th Floor, Rm.183 South Sathorn Rd., Yannawa,Sathorn, Bangkok (TH)

( * ) Notice: Subject to any disclaimer, the term of this patent is extended or adjusted under 35 U.S.C. 154(b) by 0 days.

(21) Appl. No.: 09/723,444

(22) Filed: Nov. 28, 2000

Related U.S. Application Data

(62) Division of application No. 09/300,021, filed on Apr. 27, 1999, now Pat. No. 6,227,102.

(51) Int. Cl.⁷ ................................................ A47J 31/42
(52) U.S. Cl. ........................................ 99/286; 99/289 R
(58) Field of Search ................................ 99/286, 289 R

(56) References Cited

U.S. PATENT DOCUMENTS

| | | | | |
|---|---|---|---|---|
| 3,107,600 A | 10/1963 | Brun-Buisson | ............... | 99/286 |
| 3,327,615 A | 6/1967 | Swan | ........................... | 99/286 |
| 3,967,546 A | 7/1976 | Cailliot | ........................ | 99/286 |
| 4,172,413 A | 10/1979 | Roseberry | .................... | 99/282 |
| 4,196,658 A | 4/1980 | Takagi et al. | .................. | 99/286 |
| 4,226,175 A | 10/1980 | Sandor | ........................ | 99/286 |
| 4,406,217 A | 9/1983 | Oota | ............................ | 99/286 |
| 4,510,853 A | 4/1985 | Takagi | ........................ | 99/286 |
| 4,555,984 A | 12/1985 | Yamashita | .................... | 99/286 |
| 4,624,177 A | 11/1986 | Ito et al. | ....................... | 99/286 |
| 4,703,687 A | 11/1987 | Wei | .............................. | 99/286 |
| 4,706,555 A | 11/1987 | Nakamura et al. | ............. | 99/283 |
| 4,742,767 A | 5/1988 | Komatsu et al. | ............... | 99/280 |
| 4,841,849 A | 6/1989 | Shimomura et al. | ........... | 99/282 |
| 4,876,953 A | 10/1989 | Imamura et al. | ............... | 99/280 |
| 4,895,308 A | 1/1990 | Tanaka | ........................ | 241/65 |
| 5,083,502 A | 1/1992 | Enomoto | ..................... | 99/286 |
| 5,224,414 A | 7/1993 | Hunt | ............................ | 99/286 |
| 5,237,911 A | 8/1993 | Aebi | ............................ | 99/287 |
| 5,241,898 A | 9/1993 | Newnan | ....................... | 99/280 |
| 5,267,507 A | 12/1993 | Enomoto | ..................... | 99/286 |
| 5,285,705 A | 2/1994 | Buttle et al. | .................. | 99/280 |
| 5,287,795 A | 2/1994 | Enomoto | ..................... | 99/280 |
| 5,307,733 A | 5/1994 | Enomoto | ..................... | 99/280 |
| 5,322,005 A | 6/1994 | Enomoto | ..................... | 99/282 |
| 5,367,947 A | 11/1994 | Lussi et al. | ................... | 99/287 |
| 5,387,256 A | 2/1995 | Enomoto | ..................... | 99/286 |
| 5,417,145 A | 5/1995 | Joseph, Jr. et al. | ........... | 99/280 |
| 5,463,932 A | 11/1995 | Olson | .......................... | 99/280 |
| 5,465,650 A | 11/1995 | Friedrich et al. | ............. | 99/286 |
| 5,511,465 A | 4/1996 | Friedrich et al. | ............. | 99/286 |
| 5,542,342 A | 8/1996 | McNeill et al. | ............... | 99/280 |
| 5,615,601 A | 4/1997 | Eugstar | ....................... | 99/280 |
| 5,671,657 A | 9/1997 | Ford et al. | .................... | 99/286 |
| 5,676,041 A | 10/1997 | Glucksman et al. | .......... | 99/286 |

FOREIGN PATENT DOCUMENTS

| | | | | |
|---|---|---|---|---|
| JP | 5161550 | * | 5/1993 | .................. 99/286 |

* cited by examiner

*Primary Examiner*—Reginald L. Alexander
(74) *Attorney, Agent, or Firm*—Peter S. Canelias

(57) ABSTRACT

The invention relates to an automated drip-type coffee or beverage making machine with an automatic bean grinding apparatus and an automatic cleaning apparatus. The invention also incorporates improvements and features such as a projection or boss within the device which improves the operating efficiency of the bean grinding feature, an improved blade configuration which improves grinding efficiency, including a unique blade arrangement employing a plurality of blades of different lengths, and an improved lid for the coffee or beverage container which acts as an insulator, a moving and sealing cover to prevent ground material from escaping during the grinding process, a water tank insulating compartment, a double-walled grinding basket lid to aid in insulation and spreading of hot liquid, and a damping member for reducing the vibrations associated with motor operation.

4 Claims, 7 Drawing Sheets

AUTOMATIC COFFEE MAKER WITH GRINDER

CROSS-REFERENCE TO RELATED APPLICATION

This application is a division of applicants' application, U.S. application Ser. No. 09/300,021, filed Apr. 27, 1999, now U.S. Pat. No. 6,227,102 and applicants claim the benefit of priority thereto.

BACKGROUND OF THE INVENTION

Field of the Invention

The invention relates to an automated drip-type coffee making machine with a main housing for receiving a carafe, and having an automatic bean grinding apparatus and an automatic cleaning apparatus. The invention also incorporates improvements and features such as a projection or boss within the device which improves the operating efficiency of the bean grinding feature, an improved blade configuration that improves grinding efficiency, including a unique blade arrangement preferably employing three blade-types of different lengths, and an improved lid for the coffee or beverage container which acts as an insulator, a moving and sealing cover to prevent ground material from escaping during the grinding process, a water tank insulating compartment, a double-walled lid to aid in insulation and spreading of hot liquid, and a damping means for reducing the vibrations associated with motor operation.

SUMMARY OF THE INVENTION

In accordance with the present invention, there is provided an improved drip-type household coffee maker with a bean grinding feature;

An object of this invention is to provide an improved drip-type coffee maker with an automatic cleaning means for cleaning the grinding basket of coffee grounds;

Another object of this invention is to improve the efficacy and efficiency of the bean grinder through the addition of a projection or boss which decreases the distance between the grinding blades and the beans to be ground;

Another object of this invention is to improve the efficacy and efficiency of the bean grinder through the positioning of grinding blades in the vertical position;

Another object of this invention is to improve the efficacy and efficiency of the bean grinder through the addition of a unique blade mechanism employing a plurality of blade-types of different lengths, with each blade-type comprising different subparts;

Another object of this invention is to improve the insulation of a filter basket by incorporating an insulating lid on the filter basket;

Another object of this invention is to provide means for preventing ground material from escaping the filter basket during operation by means of a lid on the filter basket;

Another object of this invention is to provide sealing means between the bottom of a grinding basket to provide a tightened fit an prevent ground material from escaping during the grinding process;

Another object of this invention is to provide means to support the grinding basket to prevent the basket from descending on its hinge;

Another object of this invention is to improve the insulation of the hot water by providing an insulating compartment;

Another object of this invention is to improve the insulation of the hot water by disposing the water heating means within the insulating compartment;

Another object of this invention is to improve the insulation of the grinding chamber by means of a double-walled lid;

Another object of this invention is to improve the insulation of the grinding chamber by means of a double-walled lid with a substantially concave lower surface to aid in dispersion of the heated water;

Another object of this invention is to improve the distribution of hot water so that the distributed water will clean the interior surfaces of the grinding basket;

Another object of this invention is to improve the distribution of hot water so that the water will clean the surfaces of the grinding basket by means of a substantially concave double-walled lid configuration, while insulating the hot water within the grinding basket;

Another object of this invention is to improve the life span of the device by the addition of damping means to absorb vibration produced during operation;

Another object of this invention is to reduce the noise level during operation by the addition of damping means to absorb vibration produced during operation.

BRIEF DESCRIPTION OF THE DRAWINGS

The above-mentioned and other features and objects of this invention and the manner of obtaining them will become apparent and the invention itself will be best understood by reference to the following description of an embodiment of the invention taken in conjunction with the accompanying drawings, wherein.

DETAILED DESCRIPTION OF THE PREFERRED EMBODIMENT

The invention features an improved household coffee making machine with a bean grinder, having an improved blade configuration employing three blade-types of different lengths for rotation in the vertical plane with a projection or boss within the device to help subject the beans to be ground to further, closer grinding action of the blades, an improved lid which acts as an insulator and a supports a moving and sealing cover to prevent ground material from escaping during the grinding process, a water tank insulating compartment, a double-walled lid to aid in insulation and spreading of hot water, to improve disbursement of the water to cleanse the grinding basket of coffee grounds, and a damping means for reducing, absorbing and dissipating vibrations from the operation of the motor.

Figure 1:
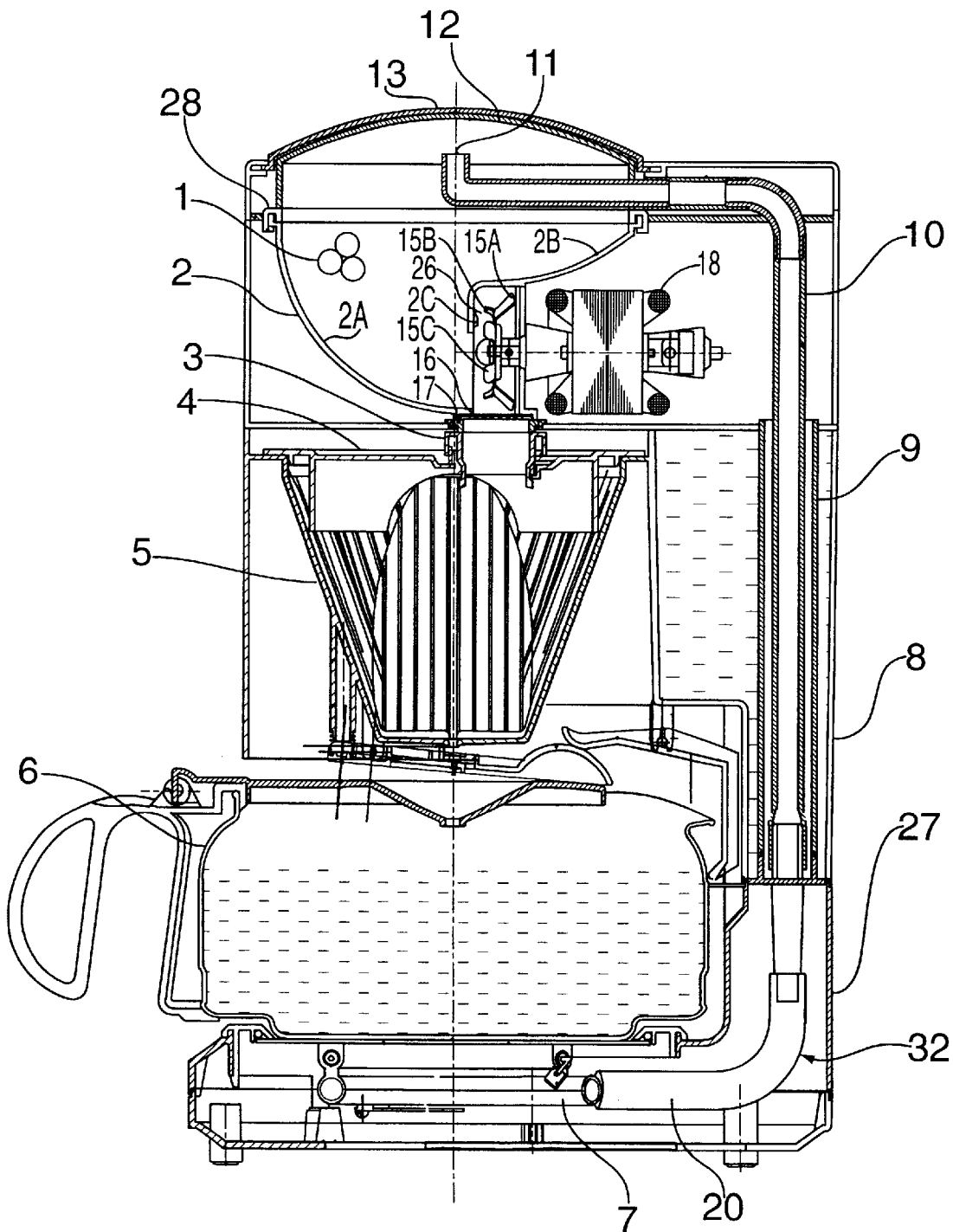
FIG. 1 is a side sectional view of the preferred embodiment of the invention with the carafe in place.

Referring now to the drawings, FIG. 1 illustrates a preferred embodiment of the invention. The apparatus has a main body or housing (27) that supports a water tank (8) and has means for receiving and supporting a beverage container (32), preferably a glass carafe (6). The housing carries a heater element (7), a water tank insulating compartment (9), a hot water tube (10), the water tube having an outlet (II) disposed beneath the bottom surface (12) of the double-walled grinding basket lid. The apparatus has a bean grinding basket (2) which holds beans to be ground (1), within the streamlined grinding basket (2), with interior surfaces of the grinding basket (2a) and (2b) which are sloped so as to aid the introduction of beans (1) into the grinding chamber (26). There is a moving and sealing cover (3) which rests on warming lid (4). The moving and sealing cover provides a substantial seal between the bottom of grinding basket and the warning lid (4).

FIG. 1 also shows a filter basket (5) of the hinged, swing type, which functions as an infused beverage extractor, and is disposed over the carafe (6) and the beverage container receiver (32). The infused beverage extractor is preferably adapted to accommodate conventional paper-type filters of the type used in coffee makers. The beverage container receiver, (32) functions to hold the carafe in the desired position, and may be equipped with a heating means, such as a warming plate, to keep the temperature of the brewed coffee in the carafe at a desired temperature.

Figure 2:
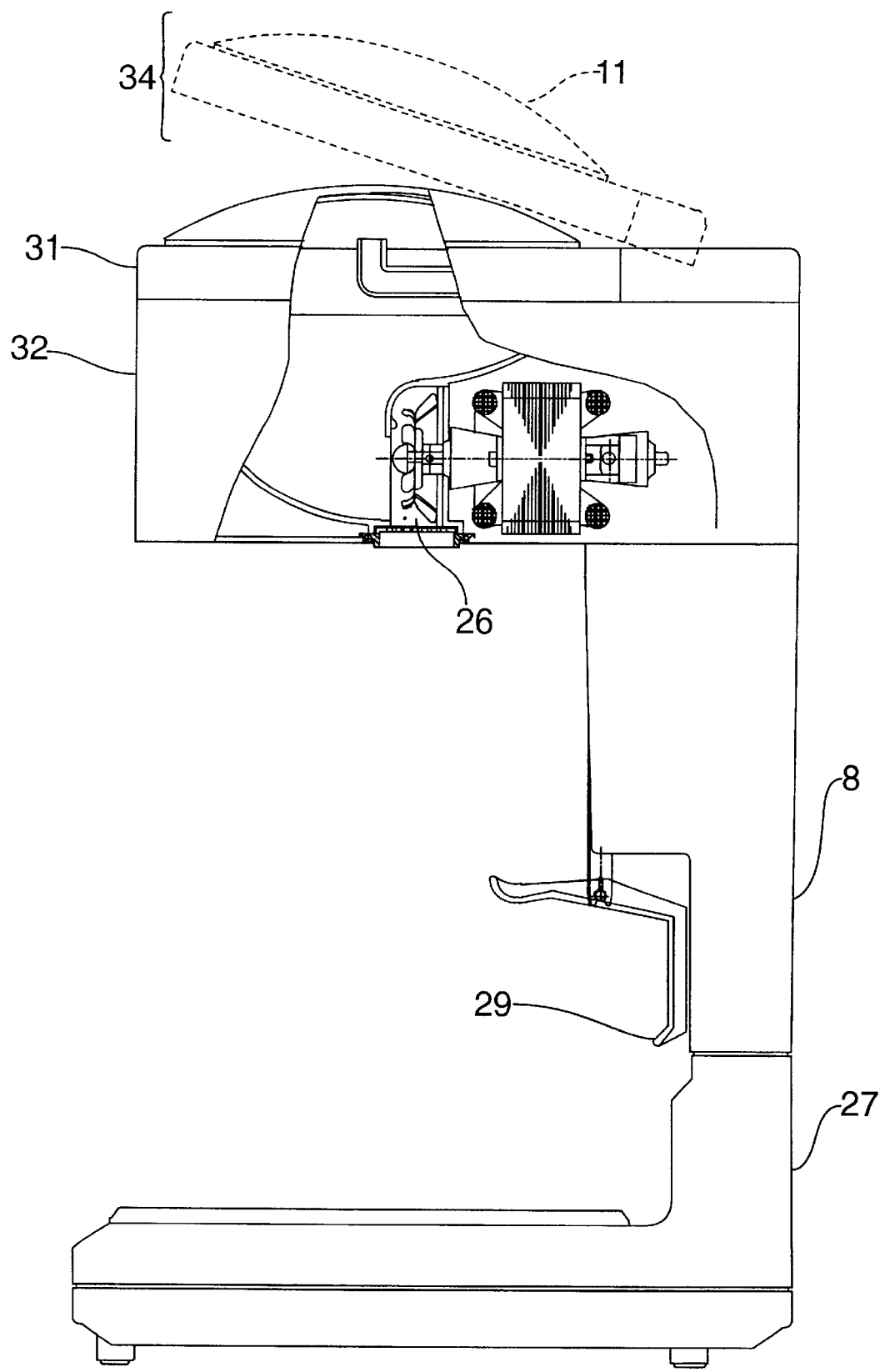
FIG. 2 is a side sectional view of the invention with the carafe removed and providing a view of the grinding mechanism, the warming lid, drip stop lever and filter basket.

As shown in FIG. 2, the double-walled lid has a top surface (13) and a bottom surface (12) where the top of the double-walled lid is shown in one preferred form, hingeably attached to the housing and conformed to the bottom surface so that in the closed position a space is defined between the top (13) and the bottom (12) to help insulate the grinding basket (2). Also shown in FIG. 2 is the preferred drip-stop release lever which releases when the carafe (6) is removed, so as to activate the-drip-stop lever (30) shown in FIG. 3, so as to stem the flow of infused beverage from the swing-type filter basket and extractor (5).

Figure 3:
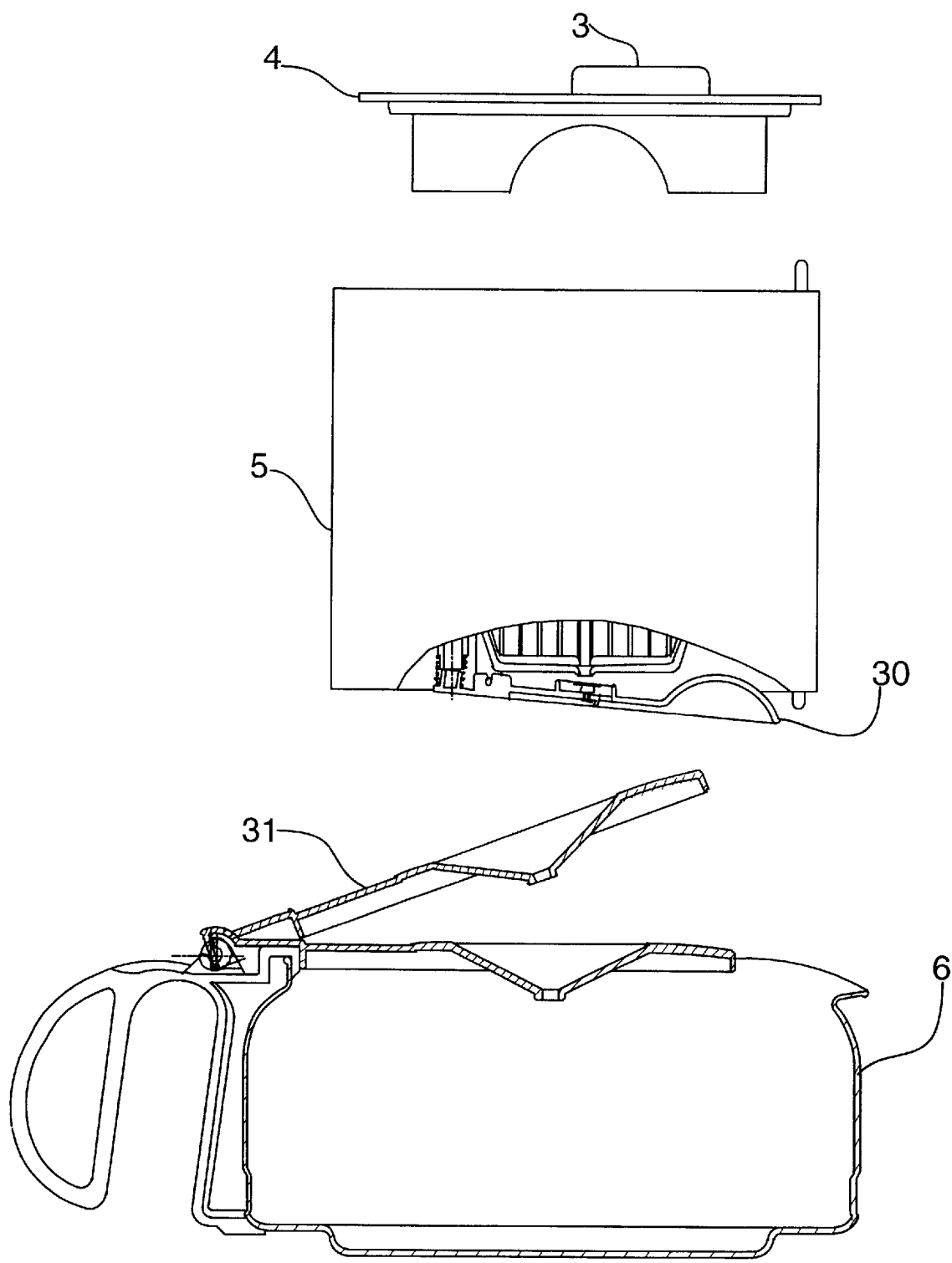
FIG. 3 is a view of the carafe and liquid dispensing means.

As shown in FIG. 3, the warming lid (4) has the moving and sealing cover (3) preferably disposed on the top of the warming lid. Carafe (6) is shown preferably with a lid (31) hingeably attached to the carafe. As further shown in FIG. 8, the moving and sealing cover is provided with springs (21) installed between the moving and sealing cover (3) and the warming lid (4) to keep the cover (3) and filter support (17) tightly fitted so as to prevent grinds or powder from spilling out of the gap during the grinding process. Cover (3) also helps to sustain the swing-out infused beverage extractor (5) from descending at the pivot point or hinge. Such descent would create a widened gap between the warming lid (4) and the grinding basket (2) due to the weight of the ground coffee and the water in the extractor (5) as well as expansion due to heating.

Figure 8:
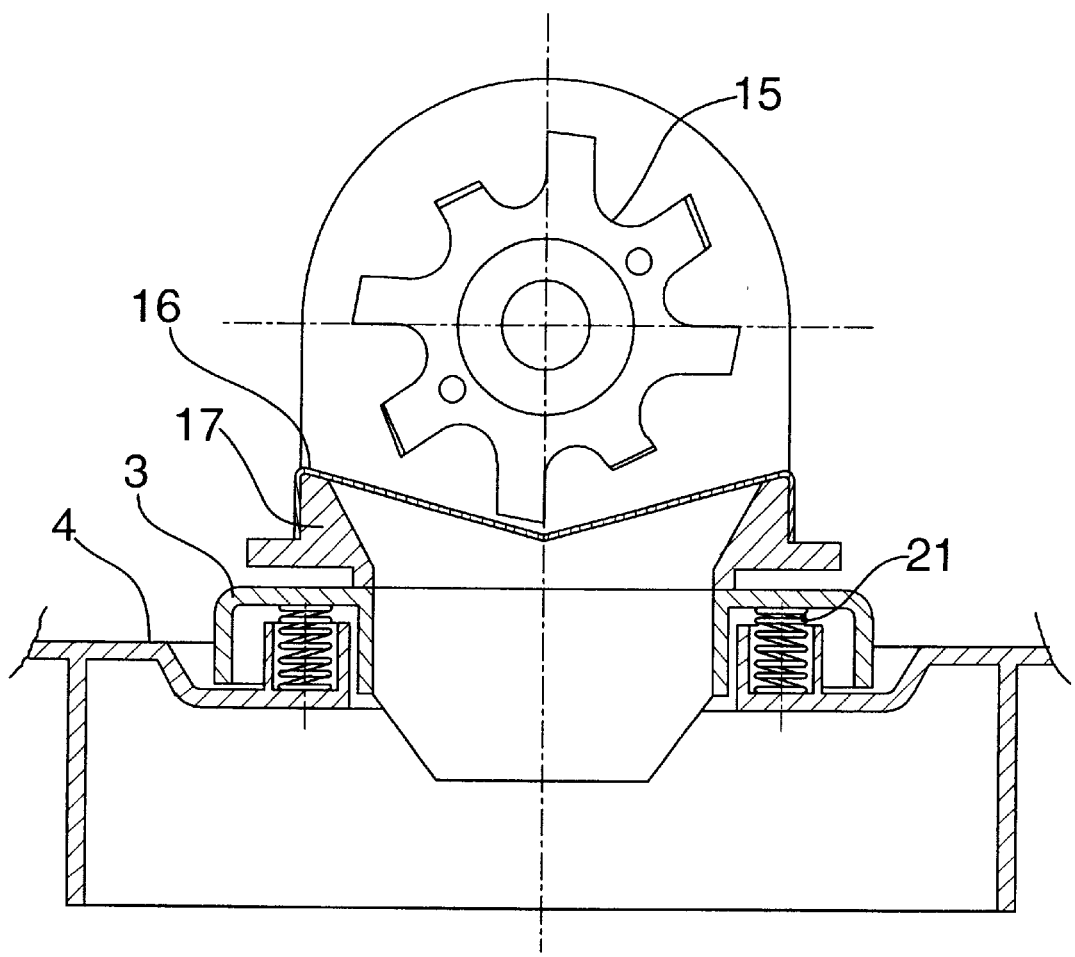
FIG. 8 is a view of the moving and sealing cover with supporting springs.
Figure 9:
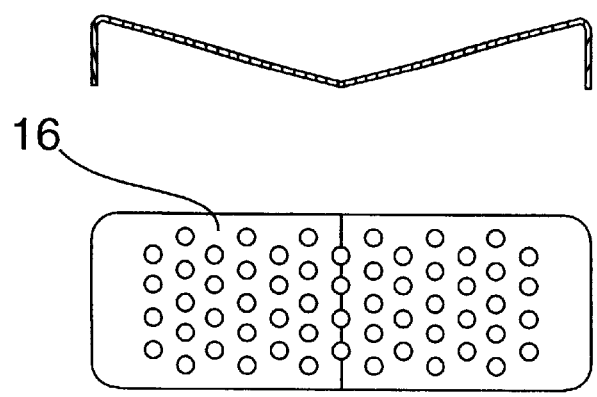
FIG. 9 is a view of the preferred embodiment of the mesh coffee filter.

The warming lid (4) rests on the infused beverage extractor (5). The warming lid performs two functions, first, to keep the temperature inside the extractor (5) at a consistently high temperature by insulating the extractor from the surrounding atmosphere. Second, the warming lid (4) prevents the ground coffee or powder from spilling out of the extractor (5) both when the ground coffee is put through the mesh filter (16) in FIG. 6 and to prevent the ground coffee from being dispersed or scattered by the hot water dripping onto the ground coffee during the brewing process. FIG. 8 shows a mesh filter support that preferably snap- fits with mesh filter (16), so that the mesh filter is removable for cleaning. The mesh filter (16) is preferably formed from stainless steel for longer life and easier cleaning.

FIG. 1 shows the preferred disposition of the grinding chamber (26). A grinding mechanism is enclosed by a preferably concave, double-walled grinding lid with a bottom wall (12) and a top wall (13). The preferred embodiment shows the double-walled lid as dome-shaped, but other configurations may be successfully employed for the purposes of the invention. The double-walled construction of the lid provides insulation for the hot water emanating from water outlet (11). There is preferably an air space or gap between the top wall (13) and the bottom wall (12) which provides further insulating capacity so as to insulate the grinding chamber and the grinding basket from the outside air, to keep the hot water temperature and the coffee temperature from losing heat to the surrounding atmosphere. The concave shape of the bottom surface of the lid permits the even spreading of heated water, so as to allow the hot water to clean the inner surfaces of the grinding basket (2a, 2b) and wash away significant amounts of powdered or ground coffee while at the same time keeping the hot water in the chamber at the desired temperature for brewing. Thus the double-walled lid performs the functions of dispersing water in a pattern sufficient to cleanse the inside surfaces of the grinding basket while keeping the temperature of the water at the desired brewing temperature.

Figure 5:
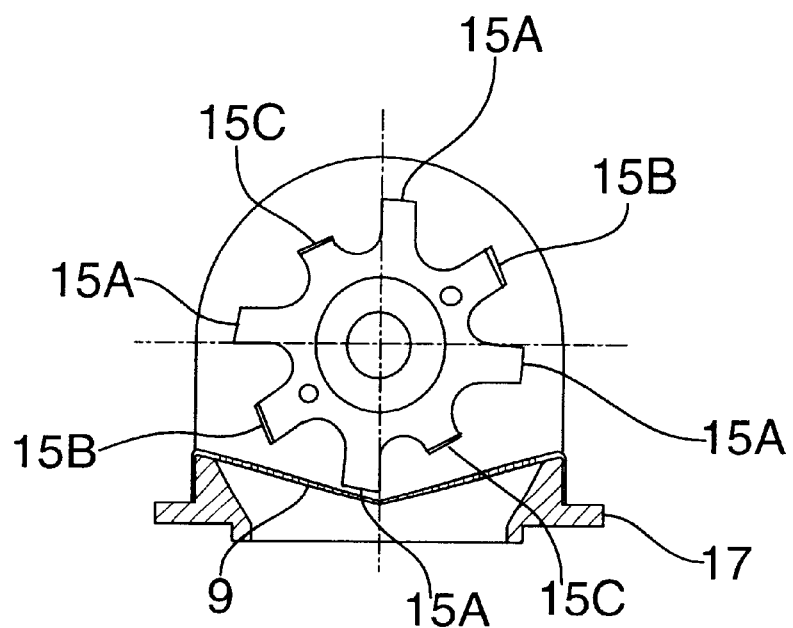
FIG. 5 is a view of a preferred embodiment of the grinding blade arrangement.
Figure 6:
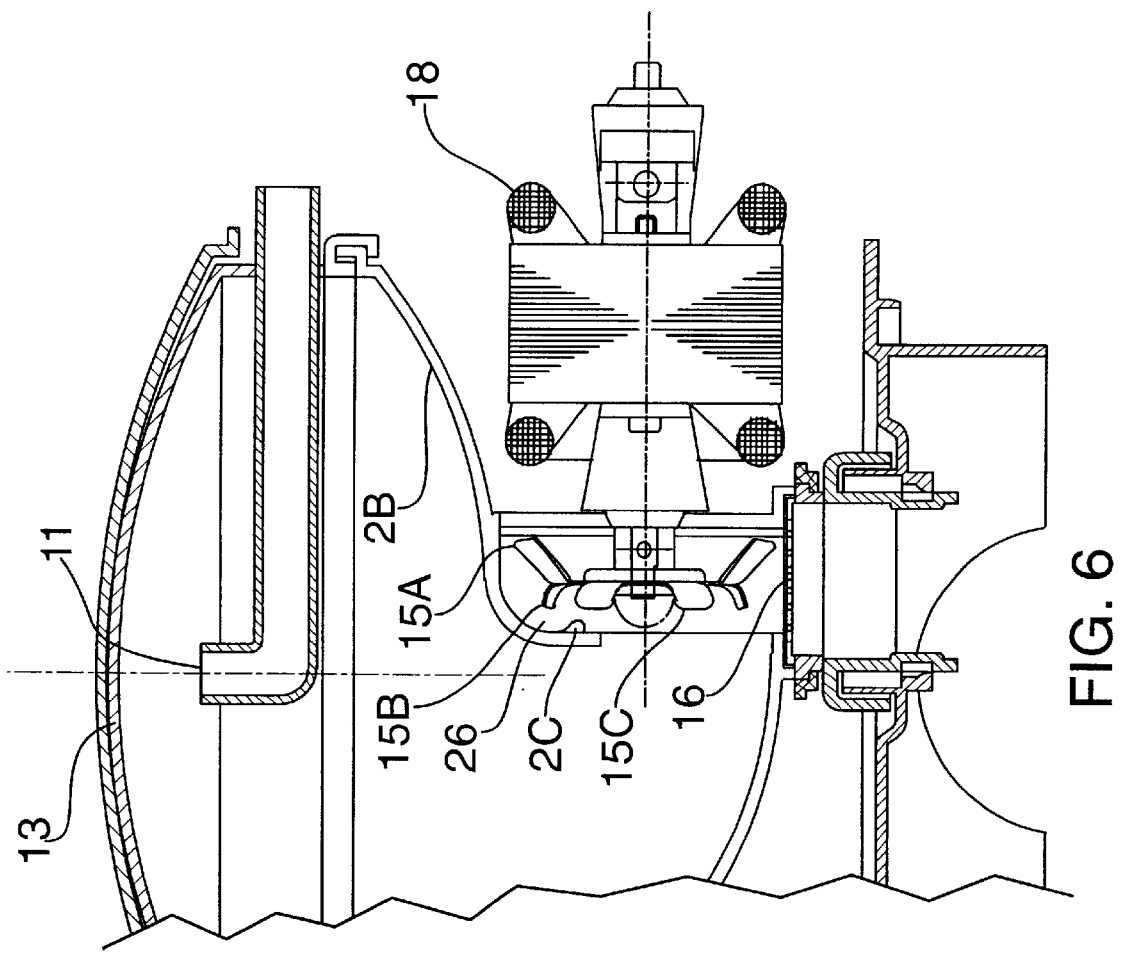
FIG. 6 is a close up sectional view of the dome-shaped lid and grinding mechanism.

The preferred arrangement of the grinding blades can be seen in FIG. 5. The preferred grinding blade configuration has three blade-types of different lengths, each comprising distinct subparts. It is understood by those skilled in the art that fewer or more grinding blade-types may be employed, and that more or fewer subparts for a blade-type may also be employed. The shortest blade (15c) has two subparts, the intermediate length blade (15b) has two subparts, and the longest blade (15a) has four subparts. FIG. 6 shows the grinding blades disposed in the grinding chamber (26). There is a projection or boss (2c) which extends from the grinding basket surface (2b) into the grinding chamber (26) where the beans are actually ground. Unlike conventional coffee bean grinders, most of which have a horizontal rotation of the grinding blades, the invention has the blades disposed so as to operate in the vertical plane. The projection (2c) is included to increase grinding efficiency. In operation, the shortest blade (15c) will initially catch the beans for grinding at the gap between projection (2c) and the blades in the grinding chamber 26. The beans will strike against projection (2c) and the shortest blades (15c), then be further ground by the intermediate length blades (15b), and finally by the longest blades (15a), so as to be reduced to the state of finely ground coffee. The ground coffee then proceeds through the mesh filter (16) to the filter basket (5).

Figure 4:
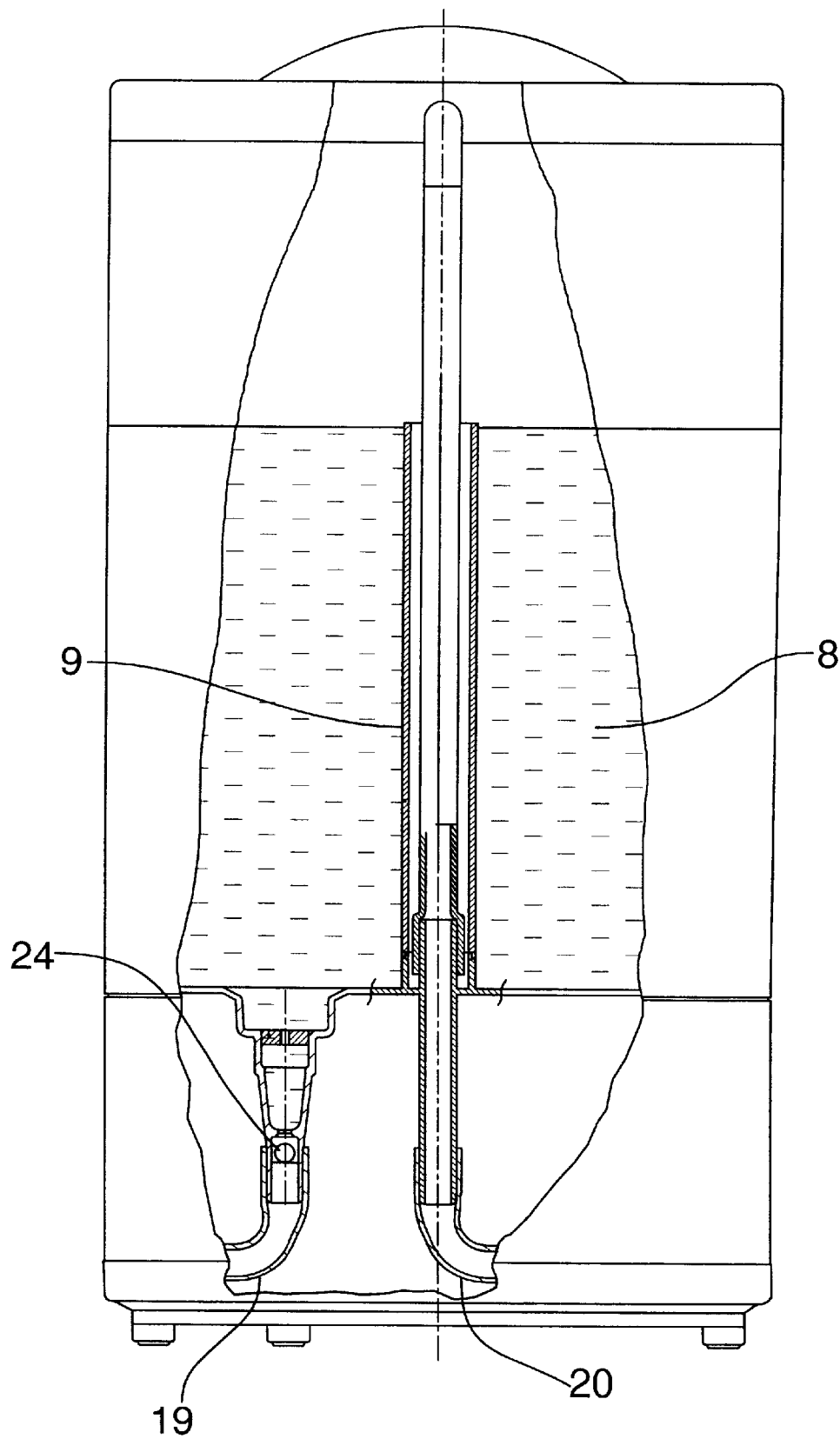
FIG. 4 is a rear sectional view of the preferred embodiment.

Referring now to FIG. 4, the preferred embodiment of the invention also incorporates an insulating compartment (9) to significantly reduce the loss of water temperature to the ambient atmosphere. Conventional coffee makers contain a hot water tube that is inside of the water tank, directly contacting the water so that the hot water temperature depends on the temperature of the water in the tank and cannot be controlled. Unlike conventional coffee makers, the invention incorporates an insulating compartment (9) that extends from the lower housing (27) and is preferably in a cylindrical shape. The hot water tube (10) is thereby insulated throughout the water tank. FIG. 4 also shows the water tank or reservoir (8), a water inlet (19) and a water outlet (20). Also shown is a preferred shut-valve (24) for preventing hot water from coming back into the reservoir (8).

The combination of the disclosed three insulating means, the warming lid (4), the double walls of the grinding lid (12) (13), and the water tank insulating compartment (9) all function to keep the brewed coffee temperature in a high range, preferably between 85° C. and 88° C. The invention may also be provided with a conventional warming plate disposed beneath the carafe (6) to maintain the desired temperature of the brewed coffee. The carafe (6) is preferably formed of glass with thermal characteristics sufficient to withstand the contemplated changes in temperature.

Figure 7:
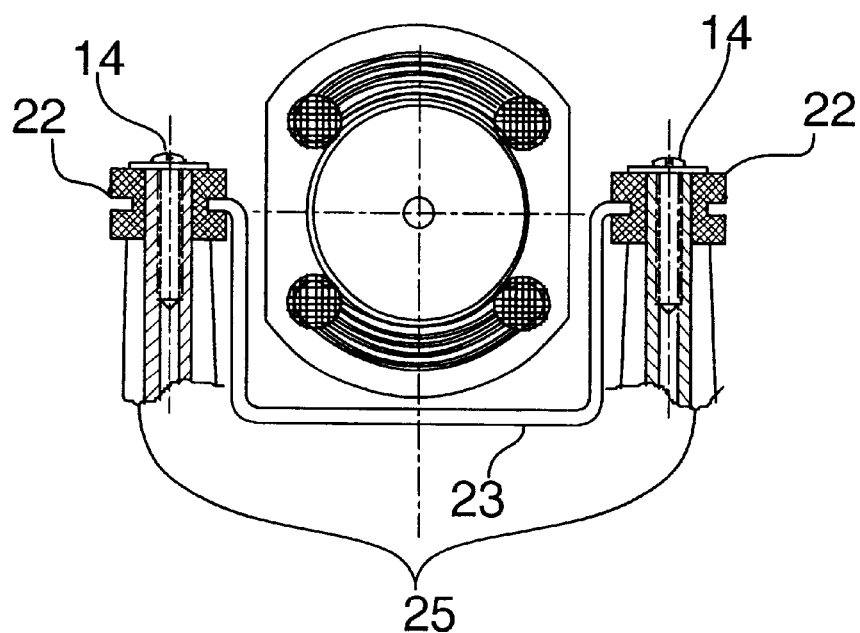
FIG. 7 is a view of the motor bracket and vibration damping means.

Referring to FIG. 7, the preferred embodiment of the invention is also provided with a vibration damping means (22). The vibration damping means, preferably in the form of a rubber spacer, is disposed between the motor brackets (23) and the screw posts (25a) (25b). The vibration damping means can be formed of any resilient material such as rubber or plastic, with sufficient elasticity to absorb and dissipate vibration. The incorporation of the vibration damping means increases the life span of the motor (18) and also reduces the level of noise created during operation of the invention. The vibration damping means absorbs and dissipates vibrations transmitted through the motor bracket (23).

OPERATION OF THE PREFERRED EMBODIMENT

Coffee beans (1) are introduced to the grinding basket. Non-heated water is introduced into the reservoir (8). Coffee beans are ground in the grinding chamber (26) by the action of the grinding blades (15) powered by an electrical motor (18). The grinding action is aided by the projection (2c), the grinding action occurring substantially in the vertical plane. When some beans have been ground, more beans are introduced to the grinding chamber by the slope of the interior of the grinding basket (2a) (2b). Ground coffee moves downward through the mesh filter (16) and passes through the moving and sealing cover (3) on warming lid (4), into the extractor (5).

Water is drawn from the reservoir (8) passing through the heater element (7) and through the hot water tube (10). Hot water emerges from the outlet (11) and towards the concave bottom surface of the double-walled lid (12), where the water disburses over the grinding chamber, thereby cleansing it of coffee grounds, and then entering into the extractor where in combination with the ground coffee an infused beverage emerges from the extractor into the carafe (6).

Since other modifications or changes will be apparent to those skilled in the art, there have been described above the principles of this invention in connection with specific apparatus, it is to be clearly understood that this description is made only by way of example and not as a limitation to the scope of the invention.

What is claimed is:
1. A coffee maker comprising:
   a housing carrying a reservoir for receiving water for brewing;
   heating means supported by the housing for receiving water from the reservoir and heating the water in order to brew coffee;
   an infused beverage extractor disposed over a beverage container;
   a grinding basket positioned above the extractor;
   the grinding basket having a double-walled lid, the double-walled lid having a top surface and a bottom surface so as to provide insulation of the grinding basket.
2. A coffee maker according to claim 1, wherein the top surface and the bottom surface of the double-walled lid define an air space between the top surface and the bottom surface so as to further insulate the grinding basket.
3. A coffee maker according to claim 1, wherein the bottom surface of the double-walled lid is substantially concave.
4. A coffee maker according to claim 2, wherein the bottom surface of the double-walled lid is substantially concave.

* * * * *